(12) United States Patent
Murakami

(10) Patent No.: US 11,232,726 B2
(45) Date of Patent: Jan. 25, 2022

(54) SEMICONDUCTOR INTEGRATED CIRCUIT

(71) Applicant: ROHM CO., LTD., Kyoto (JP)

(72) Inventor: Norikazu Murakami, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 281 days.

(21) Appl. No.: 16/444,440

(22) Filed: Jun. 18, 2019

(65) Prior Publication Data

US 2019/0385498 A1 Dec. 19, 2019

(30) Foreign Application Priority Data

Jun. 18, 2018 (JP) .............................. JP2018-115465

(51) Int. Cl.
*G09G 3/00* (2006.01)
*G06F 13/20* (2006.01)
*G06F 7/58* (2006.01)

(52) U.S. Cl.
CPC .............. *G09G 3/006* (2013.01); *G06F 7/582* (2013.01); *G06F 13/20* (2013.01); *G06F 2213/40* (2013.01); *G09G 2310/08* (2013.01); *G09G 2330/12* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 6,628,324 B1* | 9/2003 | Onishi | ................ | H04N 17/045 348/177 |
| 6,816,987 B1* | 11/2004 | Olson | .................... | H04L 43/50 714/704 |
| 10,097,341 B1* | 10/2018 | Ribo | ..................... | H04L 7/0079 |
| 2003/0101376 A1* | 5/2003 | Sanghani | ............... | G11C 7/106 714/30 |
| 2014/0267445 A1* | 9/2014 | Yaras | .................... | G09G 3/2037 345/690 |
| 2015/0102950 A1* | 4/2015 | Karner | ................ | H03M 1/1076 341/120 |
| 2018/0332276 A1* | 11/2018 | Hayashi | ................. | H04N 5/378 |

* cited by examiner

*Primary Examiner* — Christopher J Kohlman
(74) *Attorney, Agent, or Firm* — Cantor Colburn LLP

(57) ABSTRACT

An asynchronous FIFO is arranged between an input bus and an output bus with a different number of lanes. The asynchronous FIFO supplies a write clock and a read clock. A circuit block receives output data from the asynchronous FIFO via the output bus, and executes predetermined processing. In a test mode, a test circuit supplies a test pattern as interrupt data to the input bus, and detects the presence or absence of an abnormality based on a relation between the output data and its expected value based on the test pattern.

15 Claims, 7 Drawing Sheets

SEMICONDUCTOR INTEGRATED CIRCUIT

CROSS REFERENCE TO RELATED APPLICATIONS

The present invention claims priority under 35 U.S.C. § 119 to Japanese Application No. 2018-115465 filed Jun. 18, 2018, the entire content of which is incorporated herein by reference.

BACKGROUND OF THE INVENTION

1. Field of the Invention

The present invention relates to abnormality detection for a semiconductor integrated circuit.

2. Description of the Related Art

FIG. 1 is a block diagram showing a conventional semiconductor integrated circuit. A semiconductor integrated circuit 200R forms a processing system 100R together with a semiconductor integrated circuit 300R. The semiconductor integrated circuit 200R transmits data obtained by signal processing to the semiconductor integrated circuit 300R by serial data transmission. The semiconductor integrated circuit 200R mainly includes a circuit block 210, a FIFO (First In First Out) 220, a PLL circuit 230, and a transmitter 240. The circuit block 210 generates data D1. The data D1 is supplied to a data input of the FIFO 220 via a bus B1 together with a write clock CLK1.

The PLL circuit 230 frequency multiplies the write clock CLK1 so as to generate a read clock CLK2. Data D2 is read out from the FIFO 220 in synchronization with the read clock CLK2, and is supplied to the transmitter 240 via a bus B2. The transmitter 240 transmits the data D2 to the semiconductor integrated circuit 300R.

The semiconductor integrated circuit 300R mainly includes a receiver 310 and a circuit block 320. The receiver 310 receives serial data D3 from the transmitter 240. The circuit block 320 processes serial data D4 received by the receiver 310.

With such a processing system 100R, in order to provide improved reliability, an abnormality detection function is implemented in the semiconductor integrated circuit 200R or the semiconductor integrated circuit 300R.

For example, the semiconductor integrated circuit 200R is provided with a frequency detector 250 that monitors the clock CLK2 which is an output of the PLL circuit 230. When an abnormal frequency is detected in the clock CLK2, the frequency detector 250 asserts a fail signal.

Furthermore, the semiconductor integrated circuit 300R is provided with a judgment unit 330 that monitors the data D4 received by the receiver 310. The judgment unit 330 is capable of detecting an abnormality of the data D4 by comparing the data D4 with its expected value or otherwise by comparing an error-check value embedded in the data D4 with its expected value.

As a result of investigating the processing system 100R shown in FIG. 1, the present inventor has come to recognize the following problem.

When an abnormality is detected by the judgment unit 330, such an arrangement is not capable of distinguishing between a transmission error that can occur in transmission from the transmitter 240 to the receiver 310 and an error that can occur in an internal component of the semiconductor integrated circuit 200R. Furthermore, in a case in which an error-check value is embedded in the data by the transmitter 240, such an arrangement is not capable of detecting an error that occurs in the FIFO 220.

SUMMARY OF THE INVENTION

The present invention has been made in order to solve such a problem. Accordingly, it is an exemplary purpose of an embodiment of the present invention to provide a semiconductor integrated circuit that is capable of detecting an abnormality that occurs in an asynchronous FIFO.

An embodiment of the present invention relates to a semiconductor integrated circuit. The semiconductor integrated circuit comprises: a PLL circuit structured to frequency multiply a write clock so as to generate a read clock; an asynchronous FIFO (First In First Out) arranged between an input bus and an output bus configured with a different number of lanes; a circuit block structured to receive output data of the asynchronous FIFO via the output bus, and to execute predetermined processing; and a test circuit structured such that, in a test mode, a test pattern is supplied as interrupt data to the input bus, and a presence or absence of an abnormality is detected based on a relation between the output data and an expected value thereof based on the test pattern.

Another embodiment of the present invention relates to a bridge chip. The bridge chip comprises: a receiver structured to receive image data from an external processor; a processing unit structured to process the image data received by the receiver; a PLL circuit structured to frequency multiply a write clock so as to generate a read clock; an asynchronous FIFO (First In First Out) to which the image data processed by the processing unit is to be written according to the write clock, and from which the image data can be read out according to the read clock; a transmitter structured to transmit output data of the asynchronous FIFO to an external circuit; and a test circuit structured such that, in a test mode, a test pattern is supplied as interrupt data to a data input terminal of the asynchronous FIFO, and a presence or absence of an abnormality is detected based on a relation between the output data and an expected value thereof based on the test pattern.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

The description of the items (means for solving the problems) is by no means intended to describe all the indispensable features of the present invention. That is to say, any sub-combination of the features as described above is also encompassed in the technical scope of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
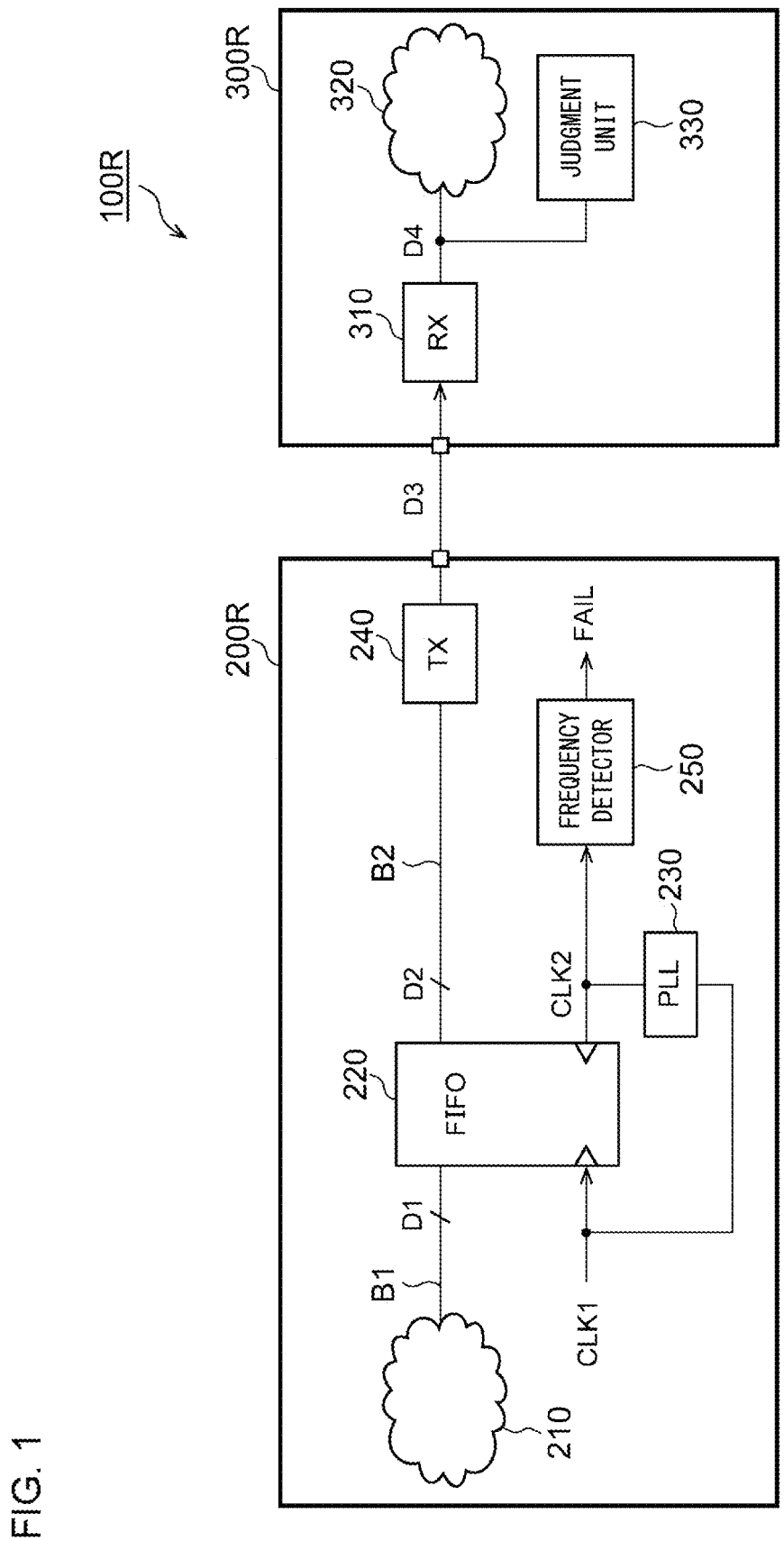
FIG. 1 is a block diagram showing a conventional semiconductor integrated circuit.

The invention will now be described based on preferred embodiments which do not intend to limit the scope of the present invention but exemplify the invention. All of the features and the combinations thereof described in the embodiment are not necessarily essential to the invention.

OVERVIEW OF THE EMBODIMENTS

An embodiment disclosed in the present specification relates to a semiconductor integrated circuit. The semiconductor integrated circuit comprises: a PLL circuit structured to frequency multiply a write clock so as to generate a read clock; an asynchronous FIFO (First In First Out) arranged between an input bus and an output bus configured with a different number of lanes; a circuit block structured to receive output data of the asynchronous FIFO via the output bus, and to execute predetermined processing; and a test circuit structured such that, in a test mode, a test pattern is supplied as interrupt data to the input bus, and a presence or absence of an abnormality is detected based on a relation between the output data and an expected value thereof based on the test pattern.

By supplying a test pattern to the input of the asynchronous FIFO, and by monitoring the output of the asynchronous FIFO, this arrangement is capable of detecting an abnormality that can occur in the asynchronous FIFO and a frequency abnormality that can occur in the PLL circuit.

Also, the test pattern may be structured as a PRBS (Pseudo Random Binary Sequence). Also, the test circuit may be structured to execute pattern matching between the output data and an expected value thereof.

Also, the test pattern may be generated by a counter. Also, the test circuit may compare an integrated value of the output data with an expected value thereof.

Also, the test circuit may support a cyclic redundancy check (CRC) operation.

Also, the circuit block may comprise a transmitter structured to transmit the output data to an external circuit.

Also, the semiconductor integrated circuit may be structured to be set to the test mode every time the semiconductor integrated circuit is started up. Also, the semiconductor integrated circuit may be structured to be set to the test mode in response to an instruction received from an external microcontroller.

Another embodiment disclosed in the present specification relates to a bridge chip. The bridge chip comprises: a receiver structured to receive image data from an external processor; a processing unit structured to process the image data received by the receiver; a PLL circuit structured to frequency multiply a write clock so as to generate a read clock; an asynchronous FIFO (First In First Out) to which the image data processed by the processing unit is to be written according to the write clock, and from which the image data can be read out according to the read clock; a transmitter structured to transmit output data of the asynchronous FIFO to an external circuit; and a test circuit structured such that, in a test mode, a test pattern is supplied as interrupt data to a data input terminal of the asynchronous FIFO, and a presence or absence of an abnormality is detected based on a relation between the output data and an expected value thereof based on the test pattern.

Also, the test pattern may be structured as a PRBS (Pseudo Random Binary Sequence). Also, the test circuit may execute pattern matching between the output data and an expected value thereof. Also, the test pattern may be generated by a counter. Also, the test circuit may compare an integrated value of the output data with an expected value thereof. Also, the test circuit may support a cyclic redundancy check operation.

Also, the bridge chip may be set to the test mode every time the bridge chip is started up. Also, in a blank period for the image data, the bridge chip may be set to the test mode. Also, the bridge chip may be set to the test mode according to an instruction received from an microcontroller. Also, the processing unit may support an OSD (On-Screen Display) function.

EMBODIMENTS

Description will be made below regarding preferred embodiments according to the present invention with reference to the drawings. In the drawings, the same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not affect the electric connection between them, or that does not damage the functions of the connection state between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not affect the electric connection between them, or that does not damage the functions of the connection state between them, in addition to a state in which they are directly coupled.

Figure 2:
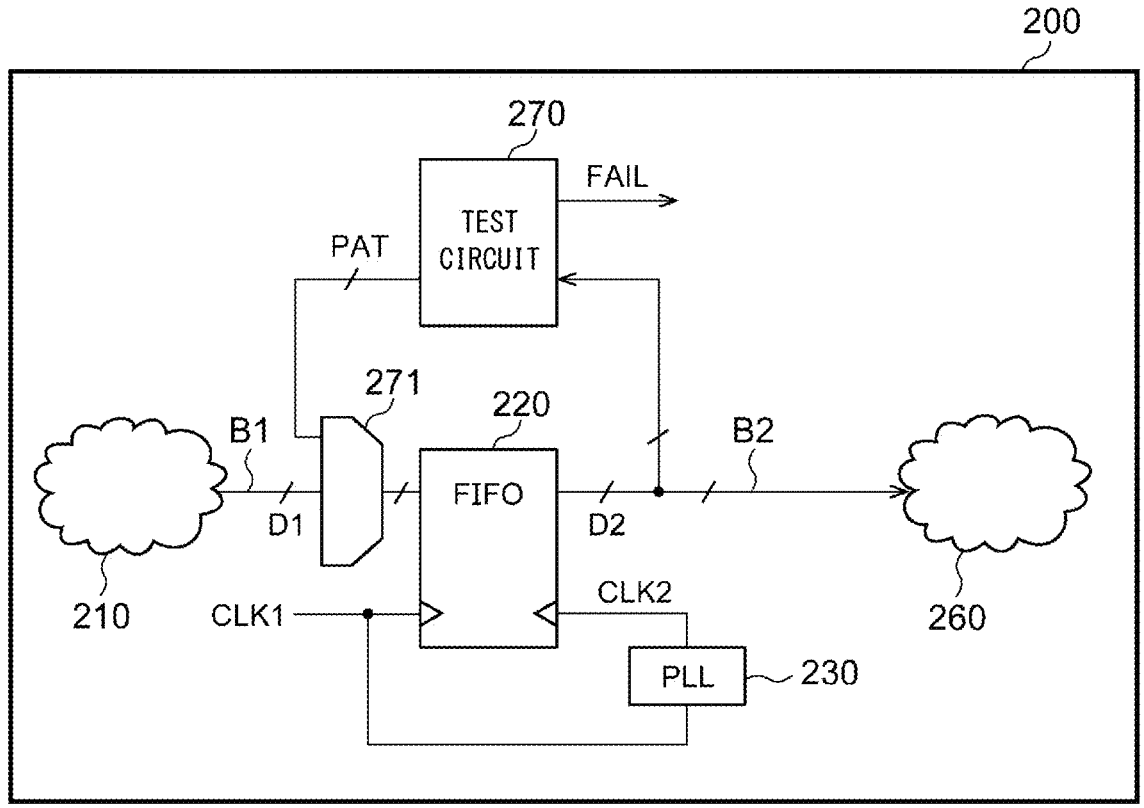
FIG. 2 is a block diagram showing a semiconductor integrated circuit according to an embodiment.

FIG. 2 is a block diagram showing a semiconductor integrated circuit 200 according to an embodiment. The semiconductor integrated circuit 200 includes a circuit block 210, a FIFO 220, a PLL circuit 230, a circuit block 260, and a test circuit 270.

The circuit block 210 generates data D1, and outputs the data D1 thus generated to an input bus B1. The circuit block 260 receives data D2 generated at an output bus B2, and performs signal processing on the data D2 thus received. The contents of data D1 and D2 and the kind of signal processing are not restricted in particular. The PLL circuit 230 frequency multiples a write clock CLK1, so as to generate a read clock CLK2. There is a difference in the number of lanes between the input bus B1 and the output bus B2. For example, the number of lanes of the output bus B2 is smaller than that of the input bus B1.

The asynchronous FIFO (First In First OUT) 220 is arranged between the input bus B1 and the output bus B2. The write clock CLK1 and the read clock CLK2 are supplied to the FIFO 220. The data D1 supplied via the input bus B1 is written to the FIFO 220 in synchronization with the write clock CLK1. The data thus written is read out as the data D2 by the output bus B2 in synchronization with the read clock CLK2.

The semiconductor integrated circuit 200 is configured such that the operation mode is switchable between a normal mode and a test mode. In the test mode, the test circuit 270 is set to an active state. In this mode, a test pattern PAT is supplied as interrupt data to the input bus B1 instead of the data D1. For example, a multiplexer 271 is provided on the input side of the asynchronous FIFO 220. In the normal mode, the multiplexer 271 selects the data D1 received from the circuit block 210. In the test mode, the multiplexer 271 selects the test pattern PAT. In the test mode, the test circuit 270 monitors the output data D2 of the FIFO 220, and judges the presence or absence of an abnormality based on a relation between the output data D2 and the expected value based on the test pattern PAT. Upon detecting an abnormality, the test circuit 270 asserts (set to the high level, for example) a fail signal FAIL.

The above is the configuration of the semiconductor integrated circuit 200. Next, description will be made regarding an operation thereof. In the test mode, the test pattern PAT is supplied as the input of the asynchronous FIFO 220, and the output D2 of the asynchronous FIFO 220 is monitored. When the asynchronous FIFO 220 and the PLL circuit 230 both operate normally, the output D2 of the asynchronous FIFO 220 (or a value acquired based on the output D2) matches its expected value. Conversely, when a malfunction has occurred in either the asynchronous FIFO 220 or the PLL circuit 230 (or both of them), the output D2 does not match its expected value. Accordingly, the semiconductor integrated circuit 200 is capable of detecting an abnormality that has occurred in the asynchronous FIFO 220 and the PLL circuit 230.

Figure 3:
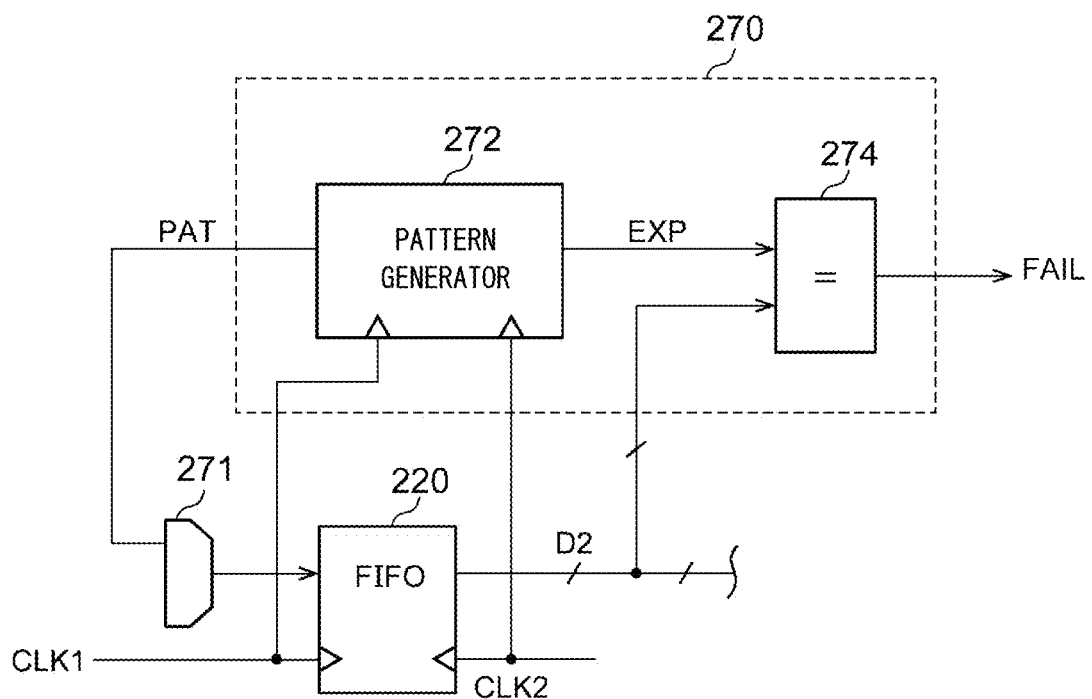
FIG. 3 is a block diagram showing an example of a test circuit.

FIG. 3 is a block diagram showing an example of the test circuit 270. The test circuit 270 shown in FIG. 3 includes a pattern generator 272 and an expected value comparator 274. The pattern generator 272 generates a PRBS (Pseudo Random Binary Sequence) in synchronization with the write clock CLK1, and outputs the PRBS thus generated as the test pattern PAT. In this case, the output data D2 of the FIFO 220 is also configured as PRBS data. The pattern generator 272 generates an expected value pattern EXP configured as PRBS data as with the test pattern PAT. The expected value comparator 274 compares the output data D2 with the expected value pattern EXP so as to judge the presence or absence of an abnormality (pattern matching). The judgment operation of the expected value comparator 274 is carried out for each lane of the output bus B2.

Figure 4:
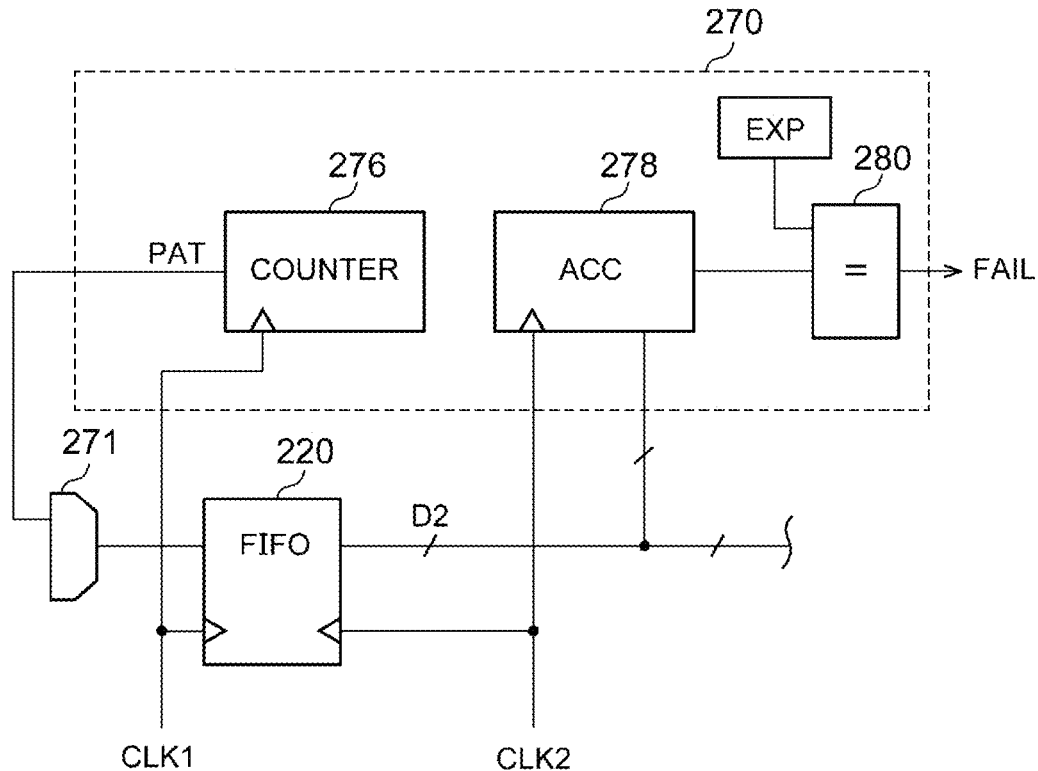
FIG. 4 is a block diagram showing another example of the test circuit.

FIG. 4 is a block diagram showing another example of the test circuit 270. The test circuit 270 shown in FIG. 4 includes a counter 276, an integrator 278, and an expected value comparator 280. The counter 276 generates the test pattern PAT such that it counts up (or otherwise counts down) in synchronization with the write clock CLK1. The integrator 278 integrates the output data D2 of the asynchronous FIFO 220. The expected value comparator 280 compares the integrated value acquired in the final stage with its expected value EXP, and generates a fail signal FAIL that indicates a comparison result.

Figure 5:
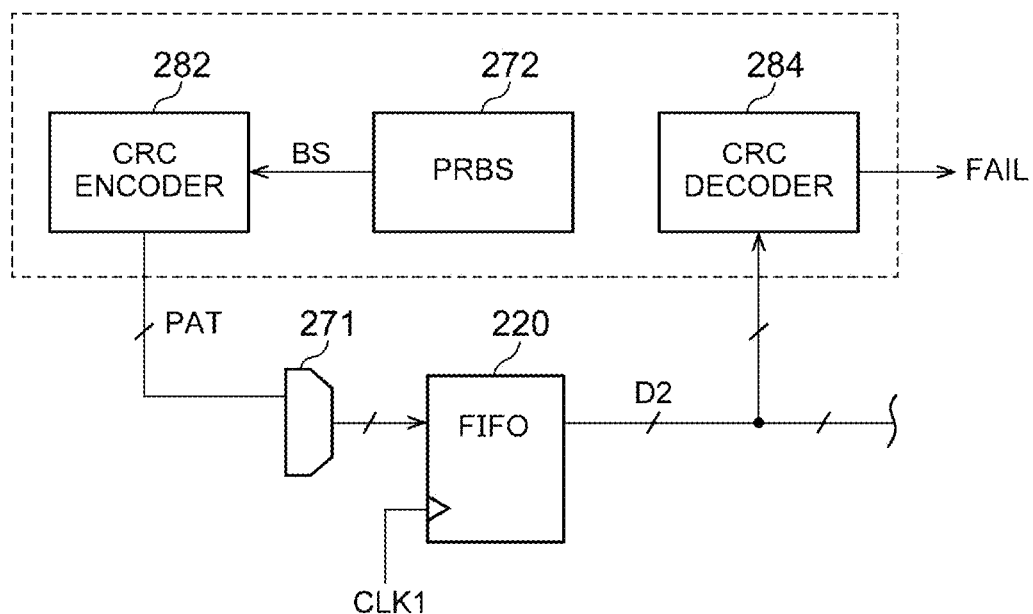
FIG. 5 is a block diagram showing yet another example of the test circuit.

FIG. 5 is yet another example of the test circuit 270. The test circuit 270 shown in FIG. 5 employs a cyclic redundancy check method. Specifically, the test circuit 270 includes a pattern generator 272, a CRC encoder 282, and a CRC decoder 284. The pattern generator 272 generates a random bit stream BS, for example. The CRC encoder 282 receives the bit stream BS, performs a predetermined operation (division using a generator polynomial) on the bit stream BS thus received, generates test data that corresponds to the quotient thus calculated, and appends the test data thus generated to the bit stream BS. The CRC decoder 284 performs a predetermined operation (division using a generator polynomial) on the output data D2, and judges whether or not the quotient thus calculated matches the test data thus received.

Figure 6:
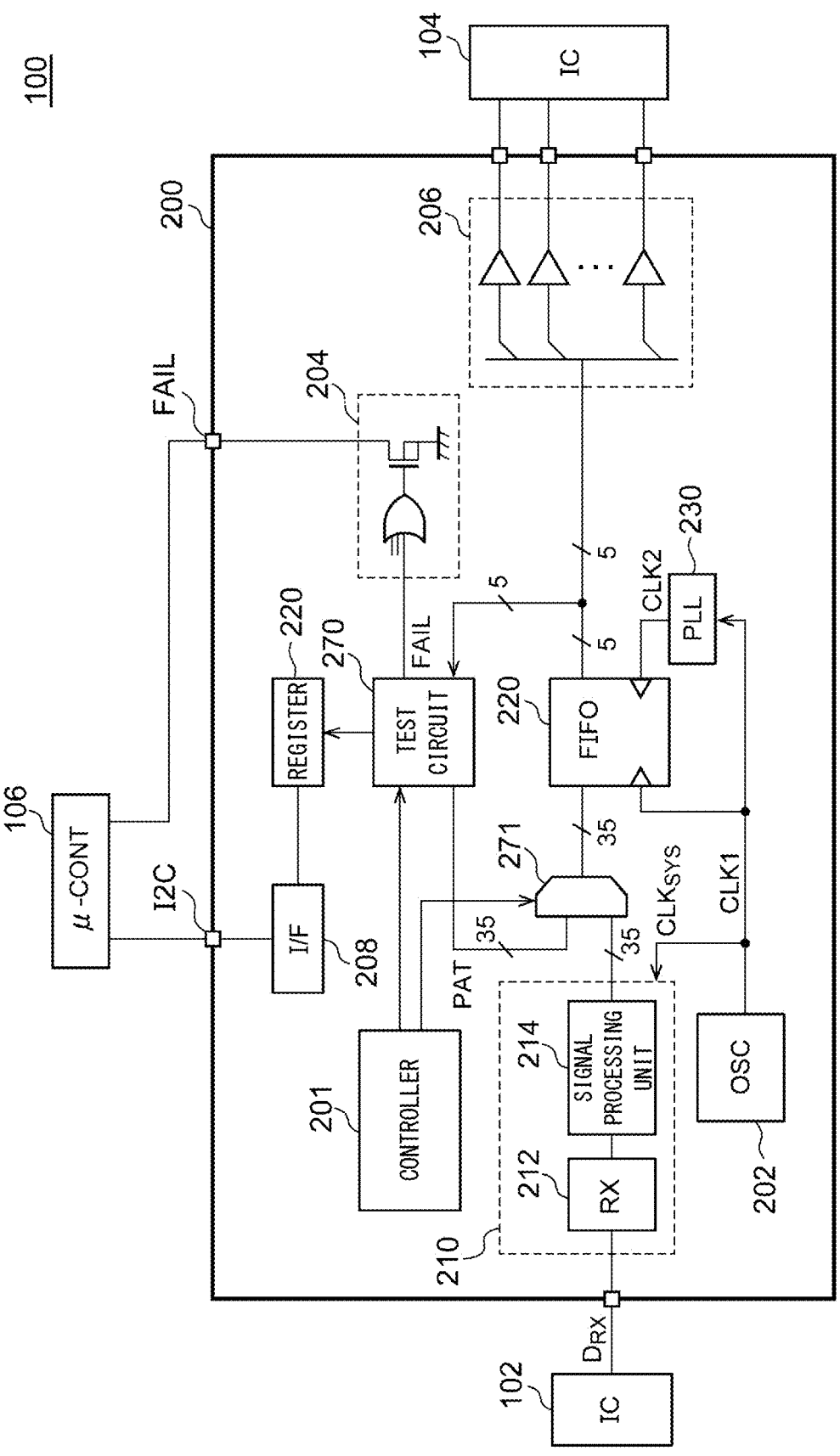
FIG. 6 is a block diagram showing a processing system including a semiconductor integrated circuit.

FIG. 6 is a block diagram showing a processing system 100 including the semiconductor integrated circuit 200. The processing system 100 includes a first integrated circuit 102, a second integrated circuit 104, and a microcontroller 106, in addition to the semiconductor integrated circuit 200. The microcontroller 106 integrally processes the processing system 100. The semiconductor integrated circuit 200 receives data $D_{RX}$ from the first integrated circuit 102, performs predetermined signal processing on the data $D_{RX}$ thus received, and transmits the data $D_{RX}$ thus processed to the second integrated circuit 104.

The semiconductor integrated circuit 200 includes a circuit block 210, an asynchronous FIFO 220, a PLL circuit 230, and a circuit block 260. The circuit block 210 includes a receiver 212 that receives the data $D_{RX}$ from the first integrated circuit 102 and a signal processing unit 214 that processes the data thus received.

The circuit block 260 is configured as a transmitter. The circuit block 260 receives the data generated by the circuit block 210 via the asynchronous FIFO 220, and transmits the data D1 thus received to the second integrated circuit 104.

The controller 201 controls the semiconductor integrated circuit 200. For example, the controller 201 sets the test circuit 270 to the test mode every time the semiconductor integrated circuit 200 is started up. After the test mode is completed, the controller 201 switches the semiconductor integrated circuit 200 to the normal mode.

An oscillator 202 generates the write clock CLK1. The write clock CLK1 also functions as a system clock $CLK_{SYS}$ to be supplied to the circuit block 210. As an example, the number of lanes of the first bus B1 is 35. The number of lanes of the second bus B2 is 5. The multiplication number set for the PLL circuit 230 is 7 or more.

The semiconductor integrated circuit 200 includes a FAIL pin. The FAIL pin is configured as an open-drain (or open-collector) interface pin. The FAIL pin is designed to be switched between two states, i.e., a low-impedance state and a high-impedance state. Multiple fail signals FAIL are input to the output stage 204 from multiple circuit blocks including the test circuit 270. When at least one fail signal is asserted, the FAIL pin is fixed to the low state. The FAIL pin is coupled to an interrupt pin of the microcontroller 106.

The semiconductor integrated circuit 200 is capable of communicating with the microcontroller 106 via an I²C (Inter IC) interface, SPI (Serial Peripheral Interface), or the like. The semiconductor integrated circuit 200 includes a register 206 and an interface circuit 208. The register 206 includes multiple abnormality detection addresses. Upon detecting an abnormality, the test circuit 270 asserts the FAIL signal, and a flag is set (value 1 is written) at a corresponding one from among the multiple abnormality detection addresses. When the FAIL pin is set to the low state, microcontroller 106 accesses the register 206 via the interface circuit 208. Subsequently, the microcontroller 106 checks which flag is turned on so as to acquire information with respect to a cause of the abnormality.

Figure 7:
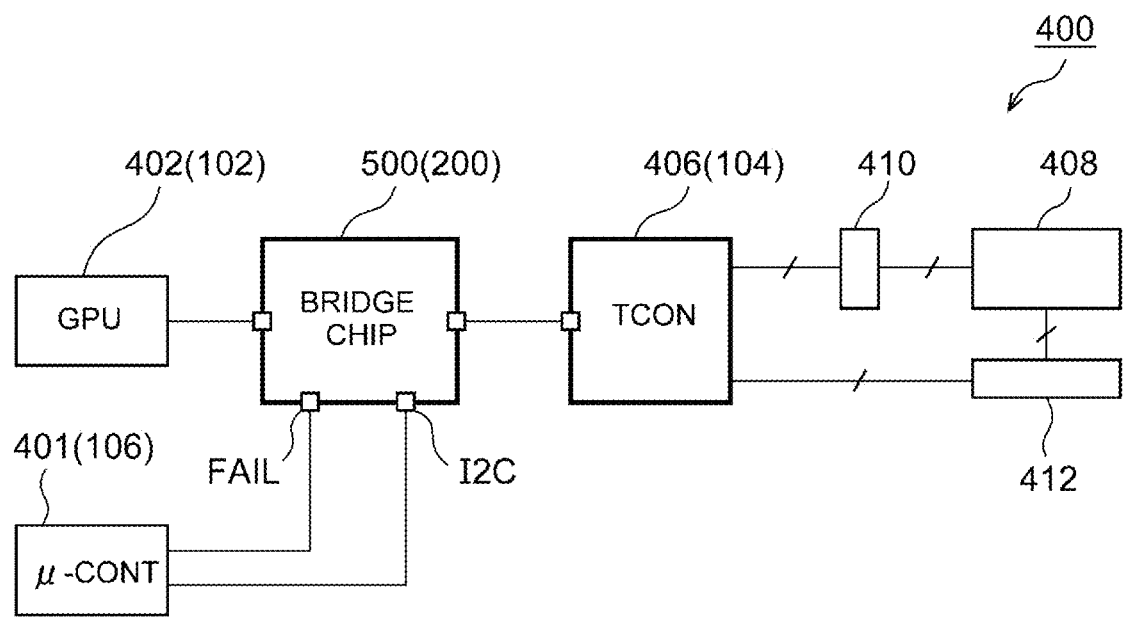
FIG. 7 is a block diagram showing a display system according to an embodiment.

The architecture of the processing system 100 shown in FIG. 6 can be employed in a display system 400. FIG. 7 is a block diagram showing a display system 400 according to an embodiment. The display system 400 includes a CPU (Graphics Processing Unit) 402, a bridge chip (which will also be referred to as a "repeater IC") 500, a microcontroller 401, a timing controller 406, a display panel 408, gate drivers 410, and source drivers 412.

The microcontroller 401, the CPU 402, the bridge chip 500, and the timing controller 406 correspond to the microcontroller 106, the first integrated circuit 102, the semiconductor integrated circuit 200, and the second integrated circuit 104, shown in FIG. 6, respectively.

The gate drivers 410 are coupled to scanning lines of the display panel 408. The source drivers 412 are coupled to data lines of the display panel 408. The number of the gate drivers 410 and the number of the source drivers 412 are designed based on the resolution of the display panel 408.

The image data generated by the GPU 402 is supplied to the timing controller 406 via the bridge chip 500. The timing controller 406 processes the image data, generates various kinds of timing signals and luminance signals, and supplies the signals thus generated to the gate drivers 410 and the source drivers 412.

The bridge chip 500 provides an additional function to a conventional display system. As such an additional function, the bridge chip 500 provides at least one from among the following functions.

ODS (On-Screen Display) function
Image check function
Interpolation function for missing data A conventional display system has the same configuration as that of the display system 400 shown in FIG. 7 except that it has no bridge chip 500. With such a conventional display system, the image data generated by the GPU 402 is directly supplied to the timing controller 406.

Figure 8:
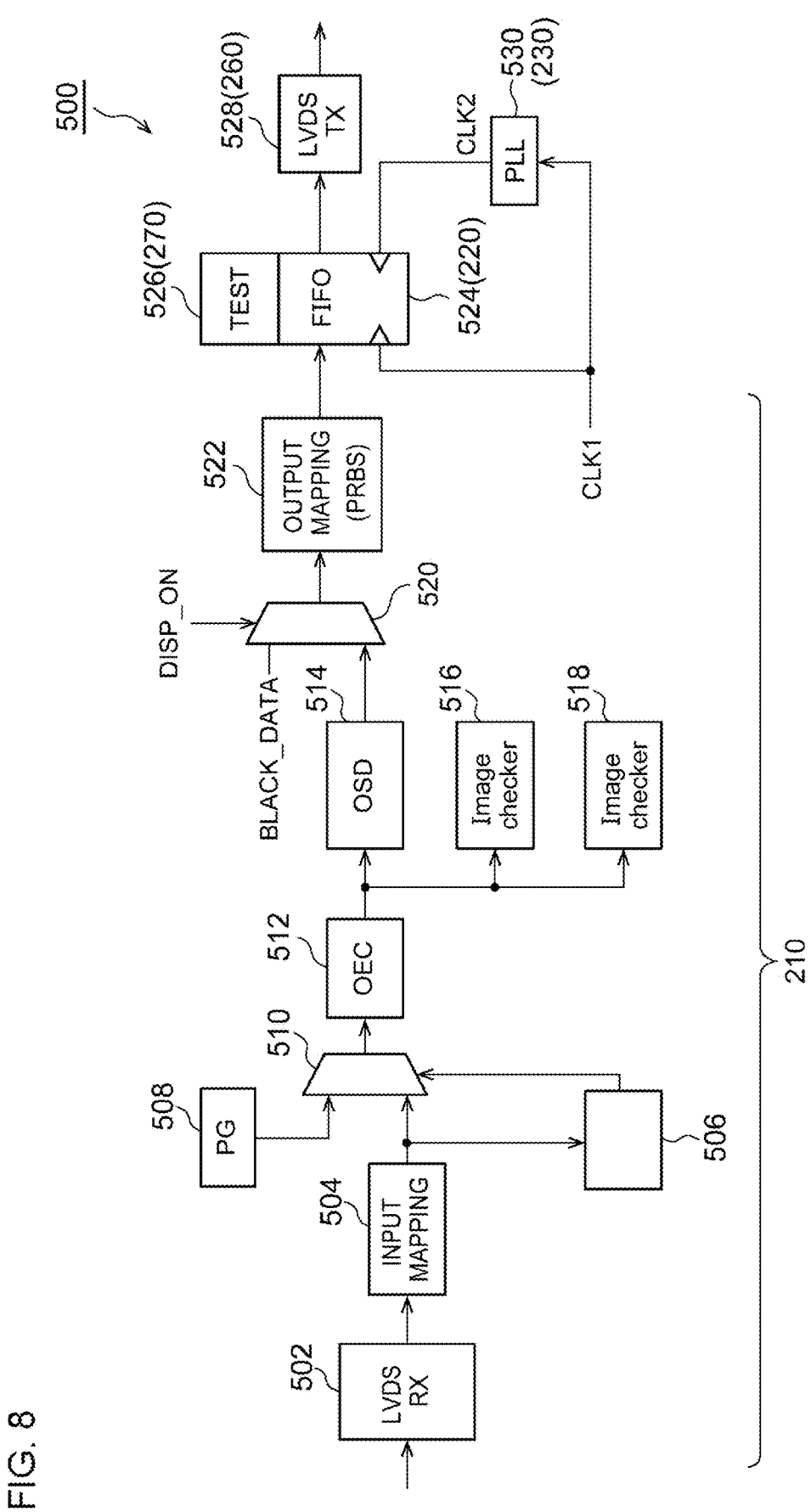
FIG. 8 is a block diagram showing an example configuration of a bridge chip.

FIG. 8 is a block diagram showing an example configuration of the bridge chip 500. The components from a receiver 502 up to an output mapping unit 522 correspond to the circuit block 210 shown in FIG. 2. An asynchronous FIFO 524 corresponds to the asynchronous FIFO 220 shown in FIG. 2. A test circuit 526 corresponds to the test circuit 270 shown in FIG. 2. A transmitter 528 corresponds to the circuit block 260 shown in FIG. 2. A PLL circuit 530 corresponds to the PLL circuit 230 shown in FIG. 2.

The receiver 502 is configured to conform to the LVDS (Low Voltage Differential Signaling) interface, and to receive image data from the GPU (402 shown in FIG. 7). The input mapping unit 504 maps the image data thus received based on the VESA format or the JIEDA format. An input data monitoring unit 506 detects an abnormality based on the clocks included in the output of the input mapping unit 504, the number of horizontal active pixels, the number of vertical active pixels, the total number of horizontal pixels, the total number of vertical pixels, etc.

A pattern generator 508 generates a pattern to be used to display a black screen, BIST (Built In Self Test) data, etc.

When the input data monitoring unit 506 detects an abnormality, a multiplexer 510 selects the pattern to be used to display a black screen.

An odd/even pixel correction unit 512 monitors odd-numbered pixels and even-numbered pixels. If there is a missing channel, which is either an odd-numbered pixel or an even-numbered pixel, the odd/even pixel correction unit 512 corrects or otherwise interpolates the missing pixel using a different pixel having the other parity.

The bridge chip 500 holds multiple OSD characters. The OSD circuit 514 overlaps the OSD characters on the image data according to an instruction received from an external microcontroller.

In some cases, the image data transmitted from the GPU 402 includes a predetermined character image or a pattern image at a predetermined position of a frame. The image check circuit 516 checks whether or not such known images have been displayed normally. Furthermore, the image check circuit 518 performs CRC calculation with respect to the image received from the GPU 402 so as to detect the presence or absence of an abnormality such as image freezing, image disturbance, or the like. A multiplexer 520 selects one from among black data and the image data received from the OSD circuit 514 according to a display-on signal DISP_ON. The output mapping unit 522 remaps the image data thus selected.

The output mapping unit 522 has a PRBS generating function, i.e., has a function as the pattern generator 272 show in FIG. 3. The multiplexer 271 shown in FIG. 3 is omitted.

When the operation mode is set to the test mode, the test circuit 526 is set to an active state. In this mode, the test circuit 526 judges the presence or absence of an abnormality based on the output data received from the asynchronous FIFO 524.

For example, when the bridge chip 500 is started up, the bridge chip 500 is set to the test mode. In the start-up operation of the bridge chip 500, various kinds of setting data and OSD character data are loaded from nonvolatile memory such as flash memory or the like coupled to the bridge chip 500 as an external component. During this loading operation, the test circuit 526 may repeatedly execute the test operation.

In addition, the bridge chip 500 is set to the test mode in the vertical blank period even in the image data output operation. Such an arrangement is capable of detecting an abnormality that can occur in the asynchronous FIFO 524 and the PLL circuit 530.

Upon detecting an abnormality by means of the test circuit 526, the bridge chip 500 notifies the microcontroller via the FAIL pin as described above. Also, when the bridge chip 500 has detected an abnormality, the bridge chip 500 may suspend the transmitter 528 so as to suspend the output of the image data.

Usage

Figure 9:
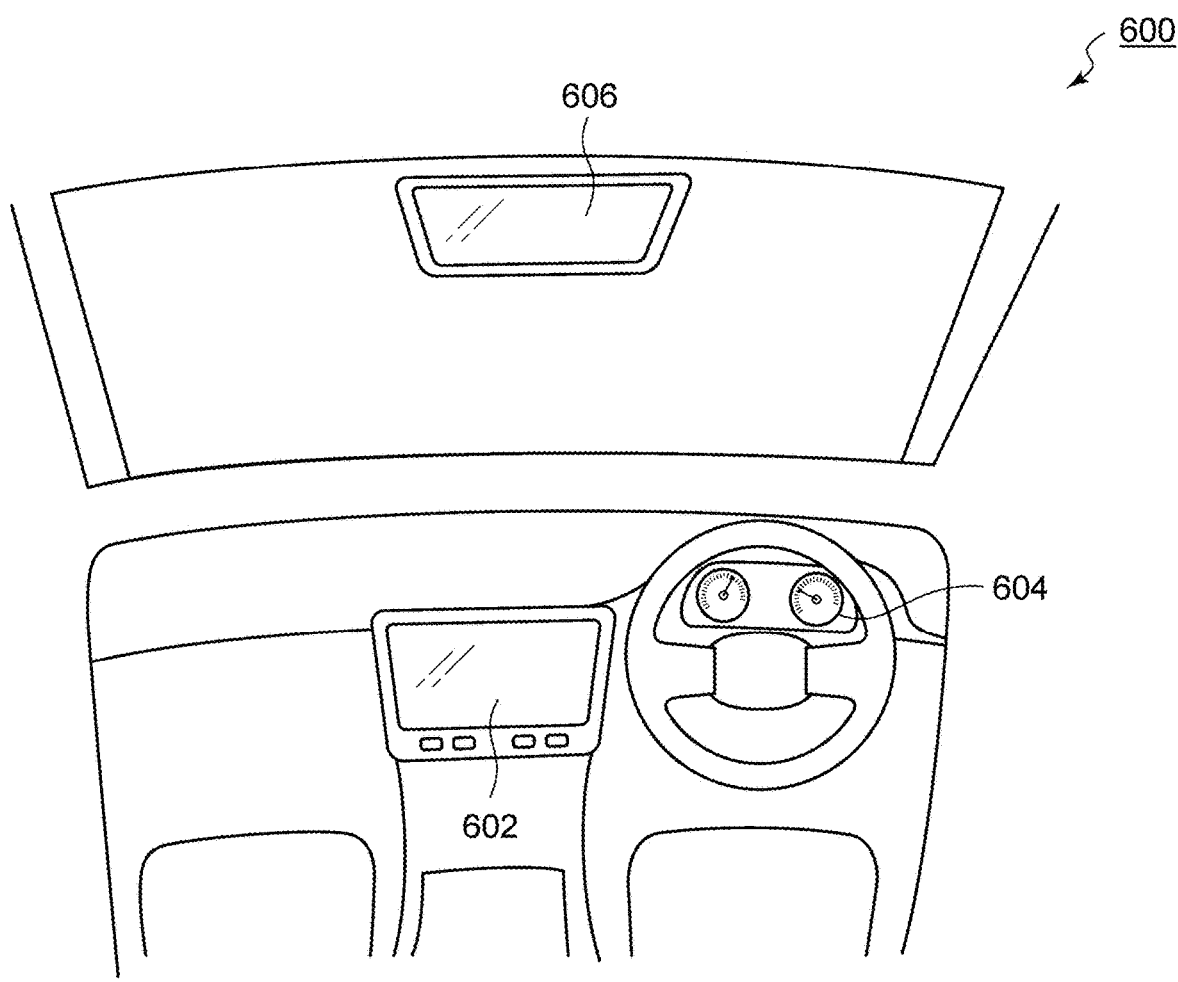
FIG. 9 is a diagram showing a cockpit of a vehicle including a display system.

Vehicles are required to operate with high reliability, which requires a display system used in the vehicle to operate with high reliability. Accordingly, the display system 400 according to the embodiment is effectively employed as an in-vehicle display system. FIG. 9 is a diagram showing a cockpit of a vehicle 600 including the display system 400. For example, the display system 400 can be suitably employed as a display unit 602 of a car navigation system. Also, the display system 400 can be suitably employed as a display unit 604 of a cluster panel. Also, the display system 400 can be suitably employed as a display unit 606 of an electronic door mirror.

The usage of the display system 400 is not restricted to such an in-vehicle display system. Also, the display system 400 can be employed in an application that is required to operate with high reliability, examples of which include industrial equipment, etc. Also, the present invention is applicable to electronic devices (consumer devices) such as laptop computers, smartphones, tablet computers, digital still cameras, etc.

While the preferred embodiments of the present invention have been described using specific terms, such description is for illustrative purposes only, and it is to be understood that changes and variations may be made without departing from the spirit or scope of the appended claims.

What is claimed is:

1. A semiconductor integrated circuit comprising:
    a PLL (Phase-Locked Loop) circuit structured to frequency multiply a write clock so as to generate a read clock;
    an asynchronous FIFO (First In First Out) arranged between an input bus and an output bus configured with a different number of lanes;
    a circuit block structured to receive output data of the asynchronous FIFO via the output bus, and to execute predetermined processing; and
    a test circuit structured to, in a test mode, supply a test pattern as interrupt data to the input bus, and to detect an abnormality based on a relation between the output data and an expected value based on the test pattern.

2. The semiconductor integrated circuit according to claim 1, wherein the test pattern is structured as a PRBS (Pseudo Random Binary Sequence),
    and wherein the test circuit executes pattern matching between the output data and an expected value thereof.

3. The semiconductor integrated circuit according to claim 1, wherein the test pattern is generated by a counter,
    and wherein the test circuit compares an integrated value of the output data with an expected value thereof.

4. The semiconductor integrated circuit according to claim 1, wherein the test circuit supports a cyclic redundancy check operation.

5. The semiconductor integrated circuit according to claim 1, wherein the circuit block comprises a transmitter structured to transmit the output data to an external circuit.

6. The semiconductor integrated circuit according to claim 1, structured to be set to the test mode every time the semiconductor integrated circuit is started up.

7. A bridge chip comprising:
    a receiver structured to receive image data from an external processor;
    a processing unit structured to process the image data received by the receiver;
    a PLL (Phase-Locked Loop) circuit structured to frequency multiply a write clock so as to generate a read clock;
    an asynchronous FIFO (First In First Out) to which the image data processed by the processing unit is to be written according to the write clock, and from which the image data can be read out according to the read clock;
    a transmitter structured to transmit output data of the asynchronous FIFO to an external circuit; and
    a test circuit structured to, in a test mode, supply a test pattern as interrupt data to a data input terminal of the asynchronous FIFO, and to detect an abnormality based on a relation between the output data and an expected value based on the test pattern.

8. The bridge chip according to claim 7, wherein the test pattern is structured as a PRBS (Pseudo Random Binary Sequence),
    and wherein the test circuit executes pattern matching between the output data and an expected value thereof.

9. The bridge chip according to claim 7, wherein the test pattern is generated by a counter,
    and wherein the test circuit compares an integrated value of the output data with an expected value thereof.

10. The bridge chip according to claim 7, wherein the test circuit supports a cyclic redundancy check operation.

11. The bridge chip according to claim 7, structured to be set to the test mode every time the bridge chip is started up.

12. The bridge chip according to claim 7, wherein, in a blank period for the image data, the bridge chip is set to the test mode.

13. The bridge chip according to claim 7, wherein the processing unit supports an OSD (On-Screen Display) function.

14. A display system comprising:
    an image processor;
    the bridge chip according to claim 7, structured to receive image data from the image processor;
    a display panel;
    a driver group structured to drive the display panel; and
    a timing controller structured as an interface between the bridge chip and the driver group.

15. A vehicle comprising the display system according to claim 14.

* * * * *